T. J. LANGSTON.
OIL BURNER.
APPLICATION FILED MAY 2, 1912.
1,050,031.
Patented Jan. 7, 1913.
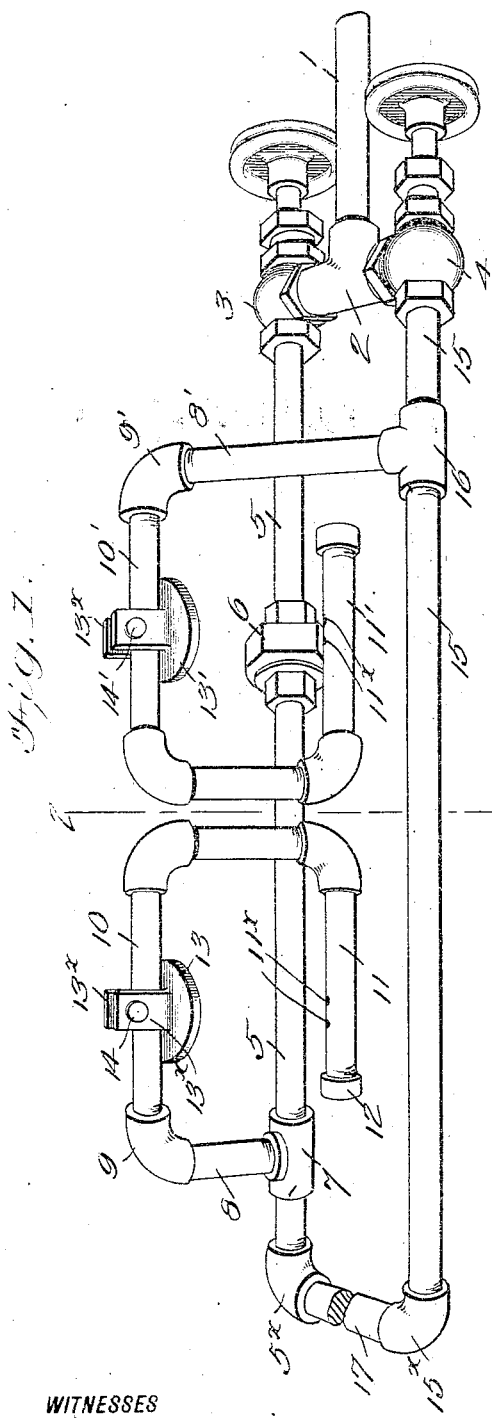
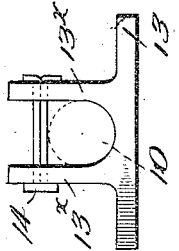
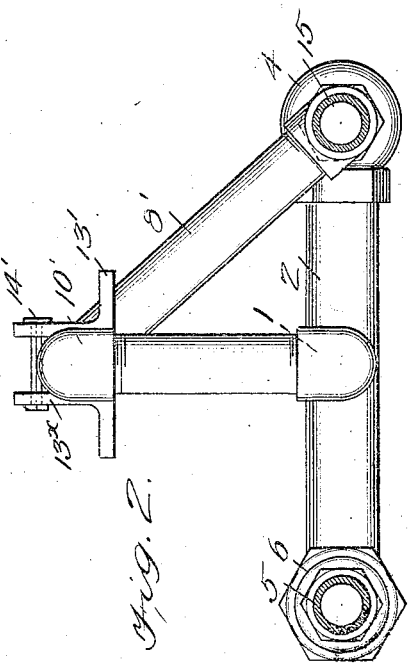
WITNESSES
INVENTOR
Thomas J. Langston
BY Munn & Co.
ATTORNEYS

UNITED STATES PATENT OFFICE.

THOMAS J. LANGSTON, OF JOHNSTON, SOUTH CAROLINA.

OIL-BURNER.

1,050,031.  Specification of Letters Patent.  Patented Jan. 7, 1913.

Application filed May 2, 1912. Serial No. 694,627.

*To all whom it may concern:*

Be it known that I, THOMAS J. LANGSTON, a citizen of the United States, and a resident of Johnston, in the county of Edgefield and State of South Carolina, have made certain new and useful Improvements in Oil-Burners, of which the following is a specification.

My invention relates to improvements in oil burners and it consists in the combinations, constructions and arrangements herein described and claimed.

An object of my invention is to provide a device by means of which oil such as kerosene, may be vaporized, and may be burned in the gaseous state.

A further object of my invention is to provide a simple form of burner to be used in cooking and heating stoves, and which is made up of pipes, elbows, T's, etc., of standard sizes and quality.

Other objects and advantages will appear in the following specification, and the novel features of the device will be particularly pointed out in the appended claims.

My invention is illustrated in the accompanying drawings, in which—

Figure 1 is a perspective view of the device, Fig. 2 is a section along the line 2—2 of Fig. 1, and Fig. 3 is a detailed view of one of the deflectors.

In carrying out my invention I provide a pipe 1 which is arranged to connect with an oil supply (not shown). The pipe 1 is connected by means of a T 2 with a valve 3 on one side and a valve 4 on the other. Connected with the valve 3 is a pipe 5, this pipe being shown in Fig. 1 in two sections joined by a union 6. At 7 a branch pipe 8 extends upwardly and inwardly, is provided with an elbow at 9 and has a horizontal portion 10 which is parallel with the pipe 5, is provided with an elbow leading to a downwardly extending portion at whose end is an elbow leading to a portion 11 which extends directly underneath the member 10. This portion 11 constitutes the burner proper. It is provided with the openings 11$^x$ for the exit of gas, and the end of this section is closed by means of a cap 12. Suspended from the member 10 directly over the pipe 11 is a deflector 13 like that shown in Fig. 3. This deflector is provided with upwardly extending flanges or ears 13$^x$ arranged to straddle the pipe 10. A pin 14 extends through the opposite ears above the pipe, thereby securing the deflector in position. The valve 4 is connected with the pipe 15.

At 16 is a branch pipe 8$^1$ which extends upwardly and inwardly. It is provided with an elbow at 9$^1$, and has a horizontal portion 10$^1$ corresponding to the portion 10 of the companion pipe. The pipe passes downwardly and connects with the portion 11$^1$ which is similar in all respects to the portion 11 of the companion pipe. The deflector 13$^1$ is disposed on the pipe 10$^1$. At the ends of the pipes 5 and 15 are the elbows 5$^x$ and 15$^x$ respectively. These elbows are joined by a solid nipple 17 which cuts off communication between the pipes 5 and 15.

From the foregoing description of the various parts of the device the operation thereof may be readily understood. The liquid fuel coming through the pipe 1 may be directed by means of the valves 3 and 4 into the pipe 5 or 15 respectively. It will pass from the pipe 5 through the pipe 8 and will be vaporized in the section 10 which is directly above the burner portion 11. The vaporized fuel will then pass down to the section 11 and out through the openings 11$^x$. The flame from the burning gas is not allowed to impinge directly upon the pipe 10, but is deflected by means of the deflector 13, which is of heat absorbing material however. The heat of the flame is thus distributed along the pipe 10 so as to insure the vaporization of the oil. The valve 4 controls the other side of the burner, the operation thereof being the same as that already described.

It will be seen that I have provided a burner which is made up of pipes and pipe fittings of standard sizes. This renders the cost of the device comparatively low. The burner is of light weight but is strong and durable. If any of the parts are broken or burned they can be readily replaced.

I claim:—

1. In an oil burner, an intake pipe, a T connected with said intake pipe, a control valve connected with each end of the T, a feed pipe connected with each of said valves, elbows at the ends of said feed pipes, a solid nipple connecting said elbows, a branch pipe from one of said feed pipes extending upwardly and inwardly to a point midway between said feed pipes, thence horizontally parallel with said feed pipes, thence downwardly and terminating in a portion directly underneath said horizontal portion, said terminating portion being perforated on its upper side and being provided with a cap at its end, and a deflector carried by said horizontal portion.

2. In an oil burner, an intake pipe, a pair of feed pipes connected with said intake pipe, a control valve for each feed pipe, a solid nipple connecting the ends of the feed pipes together, a branch pipe from one of said feed pipes extending upwardly and inwardly to a point midway of said feed pipes, thence horizontally parallel with said feed pipes, thence downwardly and terminating in a portion directly underneath said horizontal portion, said terminating portion being perforated on its upper side and being provided with a closure at its end, and a deflector carried by said horizontal portion, the other feed pipe being provided with a branch having a perforated portion extending in the opposite direction from said first named perforated portion.

THOMAS J. LANGSTON.

Witnesses:
WILLIAM TONEY,
WILLIAM A. LANGSTON.

Copies of this patent may be obtained for five cents each, by addressing the "Commissioner of Patents, Washington, D. C."